June 28, 1960 C. E. OHLHEISER 2,943,245
HUMIDITY CONTROL DEVICE
Filed June 20, 1955 3 Sheets-Sheet 1

INVENTOR.
CARLTON E. OHLHEISER
BY Herman L. Gordon
ATTORNEY

June 28, 1960 C. E. OHLHEISER 2,943,245
HUMIDITY CONTROL DEVICE
Filed June 20, 1955 3 Sheets-Sheet 2

INVENTOR.
CARLTON E. OHLHEISER
BY *Herman L. Gordon*
ATTORNEY

June 28, 1960 C. E. OHLHEISER 2,943,245
HUMIDITY CONTROL DEVICE
Filed June 20, 1955 3 Sheets-Sheet 3
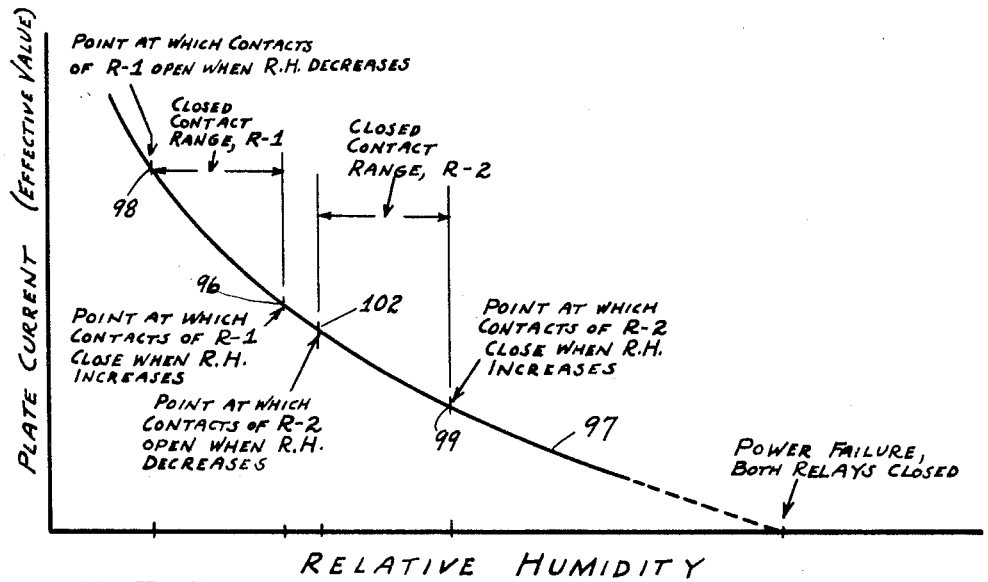
FIG.7
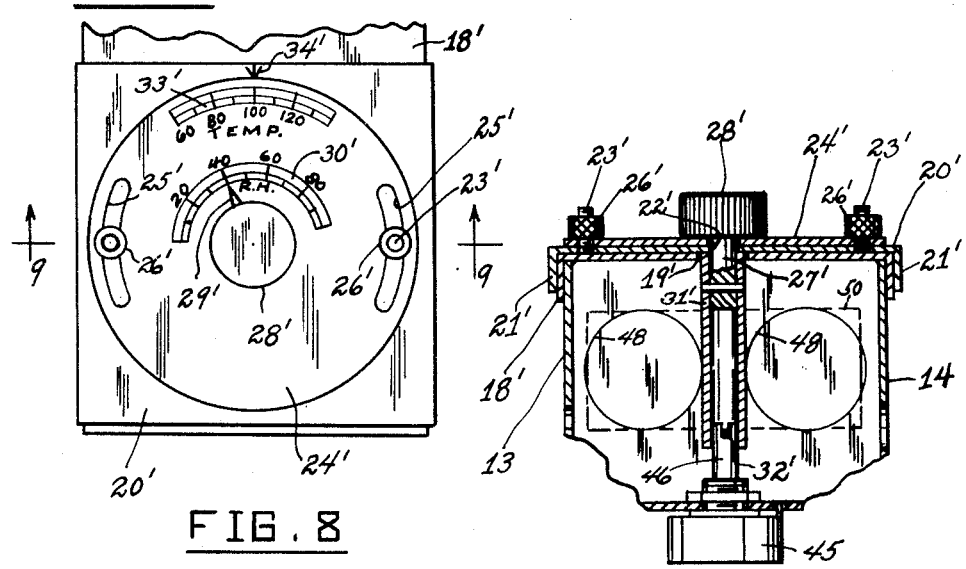
FIG.8
FIG.9
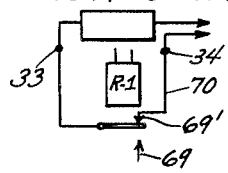
FIG.10
INVENTOR.
CARLTON E. OHLHEISER
BY Herman L. Gordon
ATTORNEY United States Patent Office 2,943,245
Patented June 28, 1960

2,943,245

HUMIDITY CONTROL DEVICE

Carlton Edward Ohlheiser, Silver Spring, Md., assignor to American Instrument Company, Inc., Silver Spring, Md.

Filed June 20, 1955, Ser. No. 516,462

2 Claims. (Cl. 317—149)

This invention relates to humidity control devices, and more particularly to settable apparatus for controlling electrical equipment to operate or to terminate operation responsive to predetermined relative humidity conditions in an area containing the apparatus.

A main object of the invention is to provide a novel and improved humidity-responsive electrical control device which is simple in construction, which is easy to set for operation at a predetermined relative humidity, and which is reliable in operation.

A further object of the invention is to provide an improved humidity-responsive electrical control device which is relatively inexpensive to manufacture, which is rugged in construction, and which provides accurate humidity control of an area being supervised thereby.

A still further object of the invention is to provide an improved humidity-responsive control apparatus including alarm means for indicating when the relative humidity in an area being supervised drifts excessively from a pre-set value, but being arranged so that an alarm indication is not given unless a serious deviation of humidity conditions occurs, whereby needless alarms are avoided, and whereby the requirements for human supervision of the system containing the apparatus can be held to a minimum.

A still further object of the invention is to provide an improved humidity-responsive control device having its elements arranged to provide a gentle but continuous circulation of the ambient air being supervised past the sensing element thereof to provide continuous sampling of the air.

A still further object of the invention is to provide an improved humidity-responsive control apparatus which includes means for averaging the humidity conditions over a relatively large area being supervised, whereby only a single unit of the apparatus is required for supervising a relatively large area, and whereby the apparatus will not be affected by a localized deviation in humidity in the space being supervised unless such deviation is sufficient to change the average sensed humidity beyond a specified tolerance with respect to the required relative humidity.

A still further object of the invention is to provide an improved humidity-responsive control apparatus having novel and improved means for setting the apparatus to respond to a specified relative humidity, said means being arranged to provide a required temperature correction without involving recourse to temperature correction charts or tables, and whereby the device may be accurately set to respond to a specified condition of relative humidity.

A still further object of the invention is to provide an improved humidity-sensitive control apparatus which will provide accurate control of humidifying or dehumidifying equipment for an area being supervised, and which will provide a positive alarm indication, as well as a positive control action, when failure of the power supply or failure of a component of the apparatus occurs.

Further objects and advantages of the invention will become apparent from the following description and claims, and from the accompanying drawings, wherein:

Figure 7 is a typical plate current characteristic curve in a humidity-responsive apparatus according to this invention, indicating that the relays of the apparatus are arranged to operate along different portions of the characteristic curve, the curve being associated with the use of the apparatus to control a dehumidifying machine.

Figure 8 is a fragmentary front elevational view of an apparatus according to this invention having means to apply a temperature correction when the apparatus is calibrated for operation around a specified value of relative humidity.

Figure 9 is a fragmentary cross-sectional view taken on line 9—9 of Figure 8.

Figure 10 is a fragmentary schematic diagram showing the manner in which a humidifying apparatus may be connected to the apparatus of the present invention to be controlled thereby.

Figure 1:
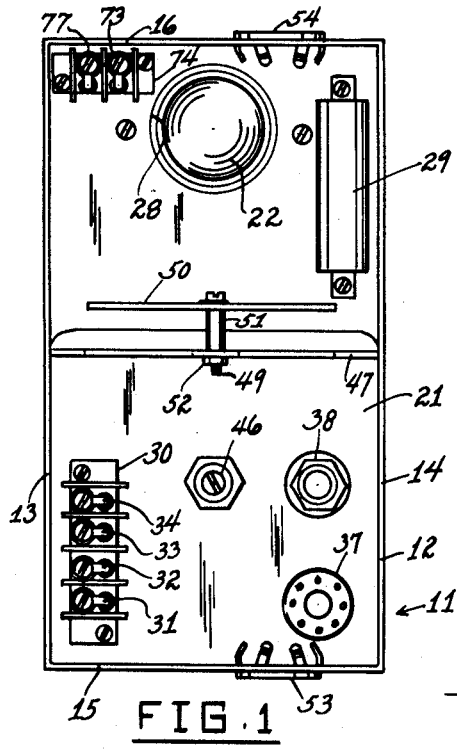
Figure 1 is a front elevational view of an improved humidity-responsive control device according to the present invention, shown with its cover removed.
Figure 2:
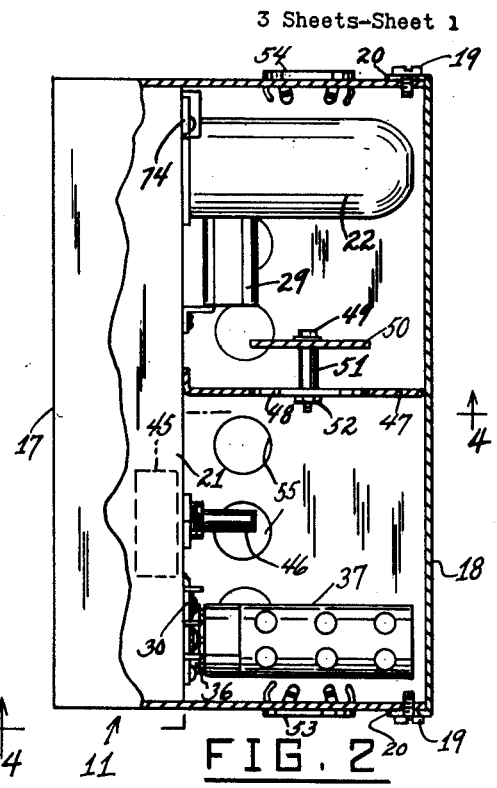
Figure 2 is a side elevational view of the apparatus of Figure 1, partly in vertical cross-section.
Figure 3:
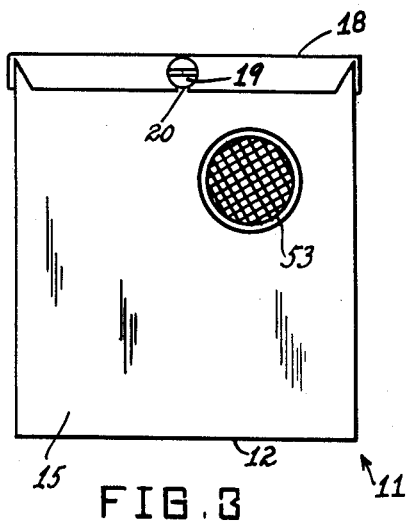
Figure 3 is a bottom view of the apparatus of Figures 1 and 2.
Figure 4:
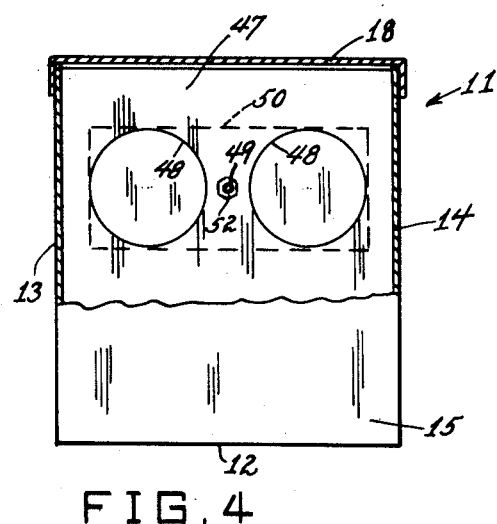
Figure 4 is a cross-sectional view taken on line 4—4 of Figure 2.

Referring to the drawings, 11 generally designates a humidity-sensitive control device according to the present invention. The device 11 comprises a generally rectangular housing 12 which is provided with suitable means, not shown, for supporting same in a vertical position, as illustrated. For example, the rear wall of the housing may be provided with conventional keyhole-shaped apertures engageable with the head portions of screws secured in a supporting wall, so that the housing 12 may be supported in a vertical position on said supporting wall.

The housing 12 has side walls 13 and 14, a bottom wall 15, and a top wall 16, as well as a rear wall 17. A removable flanged front cover 18 is provided, said front cover being removably secured to the housing by respective screws 19, 19 threadedly engaged in the marginal portions of top and bottom walls 16 and 17 and extending through notches 20 formed in the top and bottom flanges of the cover.

Secured in the rear portion of housing 12 is a chassis 21 on which are mounted the electrical components of the device.

Figure 5:
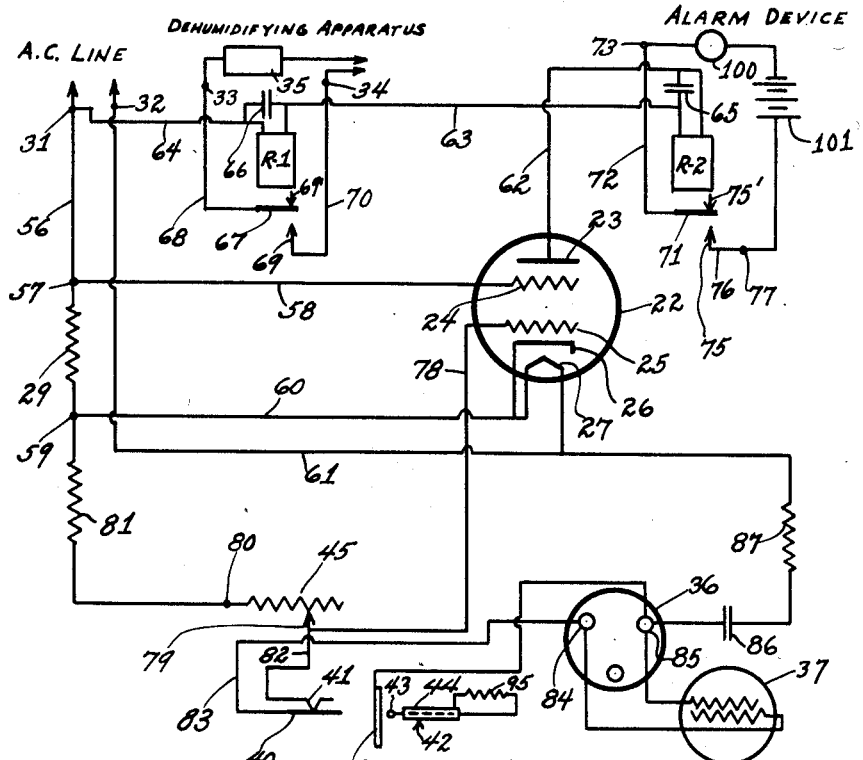
Figure 5 is a schematic wiring diagram of a humidity-responsive control device according to this invention, shown with a plug-in calibrating resistor unit for setting the apparatus for operation substantially around a specified value of relative humidity.

As shown in Figure 5, the device herein illustrated comprises a vacuum tube 22 having a plate 23, a screen grid 24, a control grid 25, a cathode 26, and a filament 27. Tube 22 is mounted in a suitable socket secured in the upper portion of chassis 21 in registry with an opening 28 formed in the chassis through which the tube projects. As shown, the socket may be located adjacent the central portion of the top wall 16, whereby tube 22 is similarly located. Mounted on the upper portion of the chassis adjacent to and parallel to side wall 14 is a resistor 29 having a resistance of the order of 500 ohms and having a wattage rating of the order of 20 watts.

Mounted on the lower portion of the chassis 21 is a terminal block 30 having a set of terminals 31, 32, 33 and 34. Terminals 31 and 32 are connected by a suitable line cord, not shown, to a suitable alternating current power supply. Terminals 33 and 34 are connected in series with the power supply of a dehumidifying apparatus 35, for dehumidifying the area to be controlled.

Mounted on the lower portion of chassis 21 adjacent bottom wall 15 and side wall 14 is a socket 36 receiving the prongs of a conventional humidity-sensing element 37 of the bifilar-wound type.

Mounted on the lower portion oof the chassis above socket 36 is a jack 38 of the type having a ring element 39, a stationary contact 40, and a flexible contact 41 normally engaging stationary contact 40 but being moved out of engagement therewith responsive to the insertion of a conventional ball-end plug 42 into the jack, whereby the ball 43 of the plug engages contact 41 and the sleeve 44 of the plug engages the ring element 39.

Mounted on the lower portion of the chassis 21 between jack 38 and terminal strip 30 is a rheostat 45 having the outwardly projecting slotted control shaft 46.

Designated at 47 is a partition plate mounted transversely on the intermediate portion of chassis 21 and substantially fitting the space in housing 12 between chassis 21 and front cover 18. Plate 47 is formed with a pair of circular apertures 48, 48 spaced on opposite sides of a vertical bolt 49 extending centrally through the plate. Designated at 50 is a generally rectangular baffle plate secured on bolt 49 above and in spaced paralel relation to partition plate 47, bolt 49 passing centrally through plate 50 and through a spacer sleeve 51 on the bolt. A nut 52 on the end of the bolt fastens baffle plate 50 rigidly to the bolt in spaced parallel relation to plate 47. Baffle plate 50 substantially overlies the openings 48, 48, so that air currents passing upwardly through said openings are deflected around the edges of the baffle plate.

A screen element 53 is provided in an aperture formed in the bottom wall 15 adjacent the humidity-sensing element 37, whereby air may enter the lower portion of the housing and move past the sensing element. A similar screen element 54 is provided in an aperture formed in top wall 16 between vacuum tube 22 and resistor 29 to allow heated air to move upwardly out of the top of the housing. Additional ventilation openings 55 are provided in the side walls 13 and 14 of the housing forwardly adjacent the chassis 21.

As shown in Figure 5, terminal 31 is connected by a wire 56 to one terminal 57 of resistor 29. Terminal 57 is connected by a wire 58 to screen grid 24. The other terminal 59 of resistor 29 is connected by a wire 60 to cathode 26 and a terminal of filament 27. The other terminal of said filament is connected by a wire 61 to line terminal 32.

Plate 23 is connected by a wire 62 to one terminal of the winding of a relay R–2 mounted beneath chassis 21. The other terminal of this winding is connected by a wire 63 to one terminal of the winding of a second relay R–1 mounted beneath chassis 21. The remaining terminal of the winding of relay R–1 is connected by a wire 64 to the line terminal 31.

A first filter condenser 65 is connected across the terminals of the winding of relay R–2 and a second filter condenser 66 is connected across the terminals of the winding of relay R–1.

Relay R–1 has the armature 67 which is connected by a wire 68 to terminal 33. Said relay has a stationary contact 69 engageable by armature 67 when less than a first predetermined value of plate current flows through the winding of relay R–1. Contact 69 is connected by a wire 70 to terminal 34.

Relay R–2 has the armature 71 which is connected by a wire 72 to a terminal 73 on a terminal block 74 secured on chassis 21. Relay R–2 has the stationary contact 75 engageable by armature 71 when less than a second predetermined value of plate current flows through the winding of relay R–2, said second value being less than the above-mentioned first value of plate current. Contact 75 is connected by a wire 76 to a terminal 77 on terminal block 74.

Control grid 25 is connected by a wire 78 to the sliding tap 79 of the rheostat 45. The remaining terminal 80 of the rheostat is connected through a resistor 81 to the terminal 59.

Flexible jack contact 41 is connected by a wire 82 to sliding tap 79. Stationary jack contact 40 is connected by a wire 83 to one terminal 84 of the humidity-sensing element socket 36. The other terminal 85 of said socket is connected through a condenser 86 and a resistor 87 to the wire 61.

It will be apparent from Figure 5 that the filament 27 is energized through a circuit comprising line terminal 31, wire 56, resistor 29, wire 60, filament 27, wire 61 and line terminal 32. Rectified plate current flows between cathode 26 and plate 23, and through the series-connected windings of relays R–2 and R–1 through a circuit comprising wire 60, cathode 26, plate 23, wire 62, the winding of relay R–2, wire 63, the winding of relay R–1, wire 64, and terminal 31. The amount of such current is governed by the amplitude of the alternating current signal on grid 25 with respect to cathode 26. The amplitude of said signal is in turn governed by the resistance of humidity-sensing element 37, since said sensing element is connected in series with resistor 87, condenser 86, rheostat 45 and resistor 81, defining a current path across the filament 27. Since grid 25 is connected to tap 79, after said tap has been adjusted to a predetermined position the alternating current potential on grid 25 will vary in accordance with changes in resistance of the humidity-sensing element 37. With increased humidity the resistance of said humidity-sensing element decreases, increasing the effective value of the negative signal potential on grid 25, thus reducing the flow of rectified plate current through tube 22. A reverse action occurs when the humidity decreases.

It will thus be seen that a negative signal in phase with the rectified current (in the plate circuit of the tube) is applied to the grid, said signal varying in magnitude with humidity, and that the magnitude of the rectified current varies substantially inversely with humidity, as shown in Figure 7.

Since the bifilar sensing element 37 is included in a branch circuit connected across filament 27, alternating current flows through the sensing element, whereby the potential on the sensing element reverses rapidly, preventing polarization, and providing for continuous stable operation thereof.

It will be further noted that the circuit may be energized from an ordinary alternating current outlet without requiring the use of transformers or outside means to provide rectified plate voltage, since it provides its own rectification, as well as the required alternating current through the sensing element preventing polarization thereof.

Figure 6:
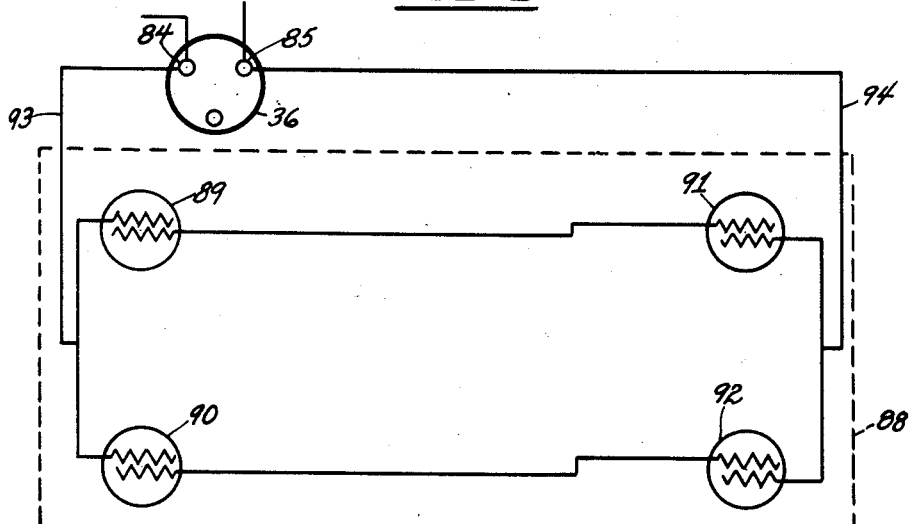
Figure 6 is a schematic wiring diagram illustrating one typical network arrangement of humidity-sensing elements connected and distributed in accordance with the present invention to provide an average response in an enclosure or area being supervised.

Figure 5 shows the circuit controlled by a single humidity-sensing element 37. In order to control the humidity in an enclosure of substantial area, such as the enclosure 88 shown in dotted view in Figure 6, a number of humidity-sensing elements, such as the elements 89, 90, 91 and 92, may be employed, each sensing element being located in a different portion of the enclosure, and the elements being connected in a suitable network, whereby the resultant resistance of the network indicates the average humidity in the enclosure. Thus, in Figure 6, humidity-sensing elements 89 and 91 are connected in series to define a first branch, and humidity-sensing elements 90 and 92 are connected in series to define a second branch. The two branches are connected in parallel to respective cable wires 93 and 94, which may be in turn connected by a suitable plug, not shown, to the socket 36. The series-parallel arrangement of Figure 6 thus provides a means of distributing the humidity-sensing elements in the area to be controlled without requiring special calibration of the device, since the device is calibrated on the basis of employing a single humidity-sensing element 37.

For purposes of calibration, a plug 42 is employed containing a calibrating resistance 95 having a value corresponding to the value of the humidity-sensing element resistance at the humidity control point, namely, at the value of humidity at which the dehumidifying apparatus 35 must be energized. Referring to Figure 7, this will be the point 96 on the plate current characteristic curve 97 of the tube 22. When the plug 42 is inserted in jack 38, the calibrating resistor 95 is substituted for the humidity-sensing element 37. The sliding tap 79 of rheostat 45 is then manually adjusted until contacts 67, 69 of relay R–1 just close, the adjustment being made in a direction decreasing the resistance of rheostat 45 since this reduces the amplitude of the signal on grid 25. The reason for this is shown in Figure 7, wherein it is seen that the contacts 67, 69 of relay R–1 remain closed over a range of plate current values between points 98 and 96 on characteristic 97 when relative humidity is increasing, and that the contacts do not close until the point 96 is reached, representing the plate current at the desired upper humidity limit for the space being controlled.

When the dehumidifying apparatus becomes energized, the contacts of relay R–1 remain closed until the humidity decreases to a value corresponding to the value of plate current in tube 22 represented by the point 98 on curve 97.

When the humidity increases beyond the value corresponding to point 96, for any reason, and reaches a value producing decrease of plate current in tube 22 to a point 99 on curve 97, the contacts of relay R–2 close and energize an alarm device 100, connected through a suitable power supply 101, preferably a storage battery, to the terminals 73, 77.

After suitable corrective action has been taken to decrease the humidity, alarm contacts 71, 75 will remain closed until a point 102 on curve 97 is reached.

By providing a permissive range of humidity increase between points 96 and 99 on curve 97, an opportunity is provided for the dehumidifying apparatus 35 to dry the air in the space being controlled without causing a needless operation of the alarm device 100. However, if the apparatus 35 is overloaded or is otherwise ineffective to halt the rise in humidity, the alarm signal will be given as soon as the humidity rises to the upper alarm limit value represented by point 99 on curve 97.

After the alarm device is energized, said alarm device will remain in operation (unless manually deenergized) until the humidity decreases below a value corresponding to the point 102 on curve 97.

When the power supply at terminals 31, 32 fails, or if there is a failure of the apparatus, for example, by failure of a component thereof such as the tube 22, the current through the windings of relays R–1 and R–2 is interrupted and both relays close their contacts. This energizes the alarm signal device 100, providing a "trouble" indication.

As will be readily apparent, in order to calibrate the device, front cover 18 is removed so that plug 42 may be inserted in jack 38 and so that rheostat shaft 46 may be rotated, as by the use of a screw driver engaged in the slot of the shaft 46.

The calibrating resistor 95 enables the device to be set for operation at a predetermined value of absolute humidity. To set the device in terms of relative humidity, temperature corrections must be applied, and this may be done by providing respective calibration plugs for respective different temperature bands, each calibration plug being provided with a calibrating resistor whose value includes the temperature correction. As an alternative, and to provide a more accurate setting of the device for operation at a desired value of relative humidity, the temperature correction may be applied at the time the device is calibrated for operation, as by means such as that illustrated in Figures 8 and 9.

In Figures 8 and 9, the front cover, shown at 18', is provided with an aperture 19' aligned with rheostat shaft 46. A plate member 20' is provided, said plate member having depending end flanges 21', 21' spaced so that the plate member 20' may be engaged transversely over front cover 18' in the manner shown in Figure 9, with the end flanges 21', 21' disposed outwardly adjacent and engaging the side flanges of the cover 18'.

Rigidly secured to plate member 20' at diametrically opposite sides thereof with respect to a central aperture 22' therein are upstanding studs 23', 23'. Designated at 24' is a circular scale plate having arcuate slots 25', 25' at diametrically opposite peripheral portions thereof, said slots being concentric with the plate 24' and being located at equal radial distances thereon. The circular plate 24' is disposed on plate member 20' with the studs 23' extending through the arcuate slots 25', as shown in Figure 8. Knurled nuts 26' are provided on the studs 23' to lock plate 24' in adjusted position on plate member 20'.

A vertical shaft 27' extends rotatably through the center of plate 24' and through the central aperture 22' of plate member 20'. Rigidly secured to the top end of shaft 27' is a knob 28' having a pointer 29' which may be moved along an arcuate relative humidity scale 30' inscribed on plate 24'. Secured to the lower portion of shaft 27' and being rotatably engageable through the aperture 19' is a sleeve 31'. Sleeve 31' is engageable over the top end of shaft 46, as viewed in Figure 9, and is provided with a transverse pin element 32' which is engageable in the slot in the top portion of shaft 46, whereby shaft 46 may be rotated by rotating the knob 28'.

The peripheral portion of circular plate 24' is inscribed with an arcuate temperature scale 33' and the plate member 20' is inscribed with an index pointer 34' adjacent scale 33', so that plate member 24' may be rotated until pointer 34' is located at the ambient temperature value on scale 33'. This introduces the required temperature correction. Knob 28' may then be rotated to set pointer 29' adjacent the value of relative humidity to be maintained in the area controlled by the device.

Plate member 20' may then be removed from front cover 18', leaving the device set to maintain the desired relative humidity.

Relay R–1 is provided with the upper contact 69' which may be employed in place of the contact 69 when a humidifying apparatus is employed instead of a dehumidifying apparatus and where it is required to maintain the controlled space at a specified level of humidity by introducing moisture into the air instead of drying the air. Figure 10 illustrates this arrangement. Under these conditions, the point 98 on the characteristic 97 will be the point at which the humidifier becomes energized when the relative humidity decreases, and point 96 will be the point where the humidifier becomes deenergized when the relative humidity increases. Alarm device 100 will provide a warning of excessive humidity, as in the previously described arrangement.

In a typical embodiment of a control device according to the present invention, the following values were employed for the elements of the circuit of Figure 5:

Resistor 29_____ 500 ohms, 20 watts.
Resistor 81_____ 27,000 ohms, ½ watt.
Resistor 87_____ 100,000 ohms, ½ watt.
Rheostat 45_____ 5 megohms, maximum.

| Component | Value |
|---|---|
| Condensers 65 and 66 | 8 mfd., 250 w.v. |
| Condenser 86 | .05 mfd. |
| Tube 22 | 50L6. |

Although certain specific embodiments of humidity control devices have been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In a humidity control device, a vacuum tube having a heater filament, a plate, a grid and a cathode, a source of alternating current having a pair of terminals, a resistor, means connecting said resistor and filament in series across said source terminals, whereby to energize said filament, said resistor having a resistance value suffifficient to develop a substantial alternating voltage potential thereacross, said cathode being connected to the common junction of said filament and resistor, relay means connected between said plate and the source terminal to which said resistor is connected, whereby rectified current flows in said relay means during the portion of the cycle of said potential when said plate is positive, said relay means comprising at least two relays connected in series and being constructed and arranged to respond to respective different ranges of rectified current, a branch circuit comprising a second resistor and electrical humidity sensing means of the bifilar type connected in series across said filament, said second resistor being connected between said common junction and said humidity sensing means, whereby alternating current flows in said branch circuit through said humidity sensing means, and means connecting said grid to the common junction of said second resistor and the humidity sensing means, whereby a negative signal in phase with said rectified current is applied to said grid, said signal varying in magnitude with humidity, and whereby the magnitude of said rectified current will vary substantially inversely with humidity.

2. In a humidity control device, a vacuum tube having a heater filament, a plate, a grid and a cathode, a source of alternating current having a pair of terminals, a resistor, means connecting said resistor and filament in series across said source terminals, whereby to energize said filament, said resistor having a resistance value sufficient to develop a substantial alternating voltage potential thereacross, said cathode being connected to the common junction of said filament and resistor, relay means connected between said plate and the source terminal to which said resistor is connected, whereby rectified current flows in said relay means during the portion of the cycle of said potential when said plate is positive, said relay means comprising at least two relays connected in series and being constructed and arranged to respond to respective different ranges of rectified current, a branch circuit comprising a second resistor and electrical humidity sensing means of the bifilar type connected in series across said filament, said humidity sensing means comprising a plurality of relatively remotely spaced bifilar sensing elements interconnected in a network whose resultant resistance varies substantially inversely with the average of the humidities at the elements, said second resistor being connected between said common junction and said humidity sensing means, whereby alternating current flows in said branch circuit through said humidity sensing means, and means connecting said grid to the common junction of said second resistor and the humidity sensing means, whereby a negative signal in phase with said rectified current is applied to said grid, said signal varying in magnitude with humidity, and whereby the magnitude of said rectified current will vary substantially inversely with humidity.

References Cited in the file of this patent

UNITED STATES PATENTS

| Number | Name | Date |
|---|---|---|
| 1,397,694 | Lidberg | Nov. 22, 1921 |
| 1,656,949 | Miller | Jan. 24, 1928 |
| 1,694,107 | Starkins | Dec. 4, 1928 |
| 1,921,172 | Taylor | Aug. 8, 1933 |
| 1,955,615 | Ulrich | Apr. 17, 1934 |
| 1,998,534 | Dautel | Apr. 23, 1935 |
| 2,220,061 | Brown | Nov. 5, 1940 |
| 2,234,858 | Brown | Mar. 11, 1941 |
| 2,282,442 | Whitlock | May 12, 1942 |
| 2,285,421 | Dunmore | June 9, 1942 |
| 2,295,894 | Dewan | Sept. 15, 1942 |
| 2,308,422 | McAllister | Jan. 12, 1943 |
| 2,424,735 | Boothroyd | July 29, 1947 |
| 2,579,716 | Wilson | Dec. 25, 1951 |
| 2,691,121 | Buchner | Oct. 5, 1954 |
| 2,691,707 | Lovejoy | Oct. 12, 1954 |
| 2,695,378 | Irvin | Nov. 23, 1954 |
| 2,729,728 | Koenig | Jan. 3, 1956 |
| 2,733,607 | Miller | Feb. 7, 1956 |
| 2,742,780 | Feigal | Apr. 24, 1956 |